US005650763A

United States Patent [19]

McKee et al.

[11] Patent Number: 5,650,763

[45] Date of Patent: Jul. 22, 1997

[54] NON-LINEAR RECIPROCATING DEVICE

[75] Inventors: John M. McKee, Hillsboro Beach; Gerald Eugene Brinkley; Philip P. Macnak, both of Wellington; James Gregory Mittel, Boynton Beach, all of Fla.

[73] Assignee: Motorola, Inc., Schaumburg, Ill.

[21] Appl. No.: 657,126

[22] Filed: Jun. 3, 1996

[51] Int. Cl.[6] .......... H04B 3/36

[52] U.S. Cl. .......... 340/407.1; 340/311.1; 340/825.46; 340/388.5; 340/393.1

[58] Field of Search .......... 340/407.1, 825.46, 340/311.1, 393.1, 384.73, 388.3, 388.4, 388.5, 388.6, 391.3, 392.5, 398.1, 815.4

[56] References Cited

U.S. PATENT DOCUMENTS

| | | | |
|---|---|---|---|
| 5,107,540 | 4/1992 | Mooney et al. | 340/825.46 |
| 5,172,092 | 12/1992 | Ngyen et al. | 340/384.73 |
| 5,327,120 | 7/1994 | McKee et al. | 340/407.1 |
| 5,379,032 | 1/1995 | Foster et al. | 340/311.1 |
| 5,546,069 | 8/1996 | Holden et al. | 340/825.46 |

OTHER PUBLICATIONS

Abraham Marcus, Radio Servicing: Theory and Practice, Power Supplies, pp. 537–542, Prentice–Hall, Inc., N.Y., 1948.

*Primary Examiner*—Jeffery Hofsass
*Assistant Examiner*—Anh La
*Attorney, Agent, or Firm*—Philip P. Macnak

[57] ABSTRACT

A non-linear reciprocating device (100, 200) includes an armature (12) including non-linear suspension members (14, 16); a compliant contactor (50, 72), coupled to a power source (BT), and further coupled to the armature (12) for generating an interrupting signal; an electromagnetic driver (25), coupled to the non-linear suspension members (14, 16) for effecting an electromagnetic field in response to the interrupting signal; and a magnetic motional mass (18) suspended by the non-linear suspension members (14, 16), and coupled to the electromagnetic field for generating a reciprocating movement of the magnetic motional mass (18) which is transformed through the non-linear suspension members (14, 16) and the electromagnetic driver (25) into tactile energy. The compliant contactor can be either a single pole compliant contactor (50) or double pole compliant contactor (72).

24 Claims, 7 Drawing Sheets

SECTION 1-1

NON-LINEAR RECIPROCATING DEVICE

FIELD OF THE INVENTION

This invention relates in general to electromagnetic transducers, and more specifically to a non-linear reciprocating device which utilizes a non-linear contactor.

BACKGROUND OF THE INVENTION

A new generation of non-rotational electromagnetic transducers have recently become available for portable communications devices, such as pagers, for operation as tactile alerting devices. The new generation of non-rotational electromagnetic transducers have significantly reduced the energy consumed by the transducers and have significantly reduced the audible sound level developed when the transducer is in actual operation as compared to the prior motor counterweight mechanisms. The gains achieved have not been without a compromise in the circuitry required to drive the non-rotational electromagnetic transducers. Because the non-rotational electromagnetic transducers utilize non-linear spring members, the transducers have generally required external drive circuits to generate a swept frequency driving signal to maximize their output during operation. While these external drive circuits have proved very useful in maximizing the output of the non-rotational electromagnetic transducers, they at best, have only approximated the natural mechanical system response of the transducers.

The requirement for external drive circuits have been largely overcome in electromagnetic vibrator devices previously utilized in power supplies in certain radio applications which have utilized a linear resilient reed, an electromagnet, and a pair of rigid interrupter contacts in association with a step-up transformer. When the electromagnetic vibrator device was connected to a storage battery, power was obtained by interrupting the current passing from the battery through the primary of the transformer. Such electromagnetic vibrator devices made and reversed the current supplied to the primary of the transformer by interrupting the current at regular intervals with the pair of interrupter contacts and reversing the voltage applied to the primary of the transformer which resulted in generating an alternating magnetic field which induced a stepped-up voltage in the secondary of the transformer. Automobile horns and door-bell buzzers are examples of other such self interrupting devices. It will be appreciated that all of these devices have utilized linear resilient reeds such as flexible cantilever beams or diaphragms as the contact elements which connect to rigid contactor elements, making these devices operational at only a single frequency dependent upon the external circuit elements to which the electromagnetic vibrator devices were attached.

What is needed is an, apparatus for driving a non-rotational electromagnetic transducer which does not require a complex external driving circuit. What is also needed is an apparatus for self-exciting the non-rotational electromagnetic transducer in a manner which relies not on the external circuit elements, but rather on the natural response of the non-rotational electromagnetic transducer. Furthermore, what is needed is an apparatus for driving the non-rotational electromagnetic transducer which utilizes the natural mechanical system response of the non-rotational electromagnetic transducer to maximize the tactile output of the non-rotational electromagnetic transducer over the non-linear operating range of the non-rotational electromagnetic transducer. And furthermore, what is needed is an apparatus for self exciting the non-rotational electromagnetic transducer which results in a frequency of operation to be swept dynamically in response to the natural response of the non-rotational electromagnetic transducer, thereby resulting in a tactile energy output to be maximized.

SUMMARY OF THE INVENTION

In accordance with a first embodiment of the present invention, a non-linear reciprocating device includes an armature, a non-linear compliant contactor, an electromagnet and a stabilized magnetic mass. The armature include a first and second non-linear suspension members. The non-linear compliant contactor is coupled to a power source which is coupled to the armature for generating an interrupting signal. An electromagnetic driver is coupled to the non-linear suspension members for effecting an electromagnetic field in response to the interrupting signal. A stabilized magnetic motional mass is suspended by the non-linear suspension members and coupled to the electromagnetic field for generating a reciprocating movement of the magnetic motional mass in response to the electromagnetic field. The reciprocating movement of the stabilized magnetic motional mass is transformed through the non-linear suspension members and the electromagnetic driver into tactile energy.

In accordance with a second embodiment of the present invention, a non-linear reciprocating device comprises an armature, an electromagnet and a stabilized magnetic mass. The armature includes a first and second non-linear suspension members. A first and second non-linear compliant contactors coupled to a power source of a first and second polarity and further alternately coupled to the armature for generating an interrupting signal of a first and second polarity. An electromagnetic driver coupled to the first and second non-linear suspension members effect an alternating electromagnetic field in response to the interrupting signal. The magnetic motional mass is suspended by the first and second non-linear suspension members and coupled to the alternating electromagnetic field for generating a reciprocating movement of the magnetic motional mass in response to the alternating electromagnetic field. The reciprocating movement of the magnetic motional mass is transformed through the first and second non-linear suspension members and the electromagnetic driver into tactile energy.

DESCRIPTION OF THE PREFERRED EMBODIMENTS

Figure 1:
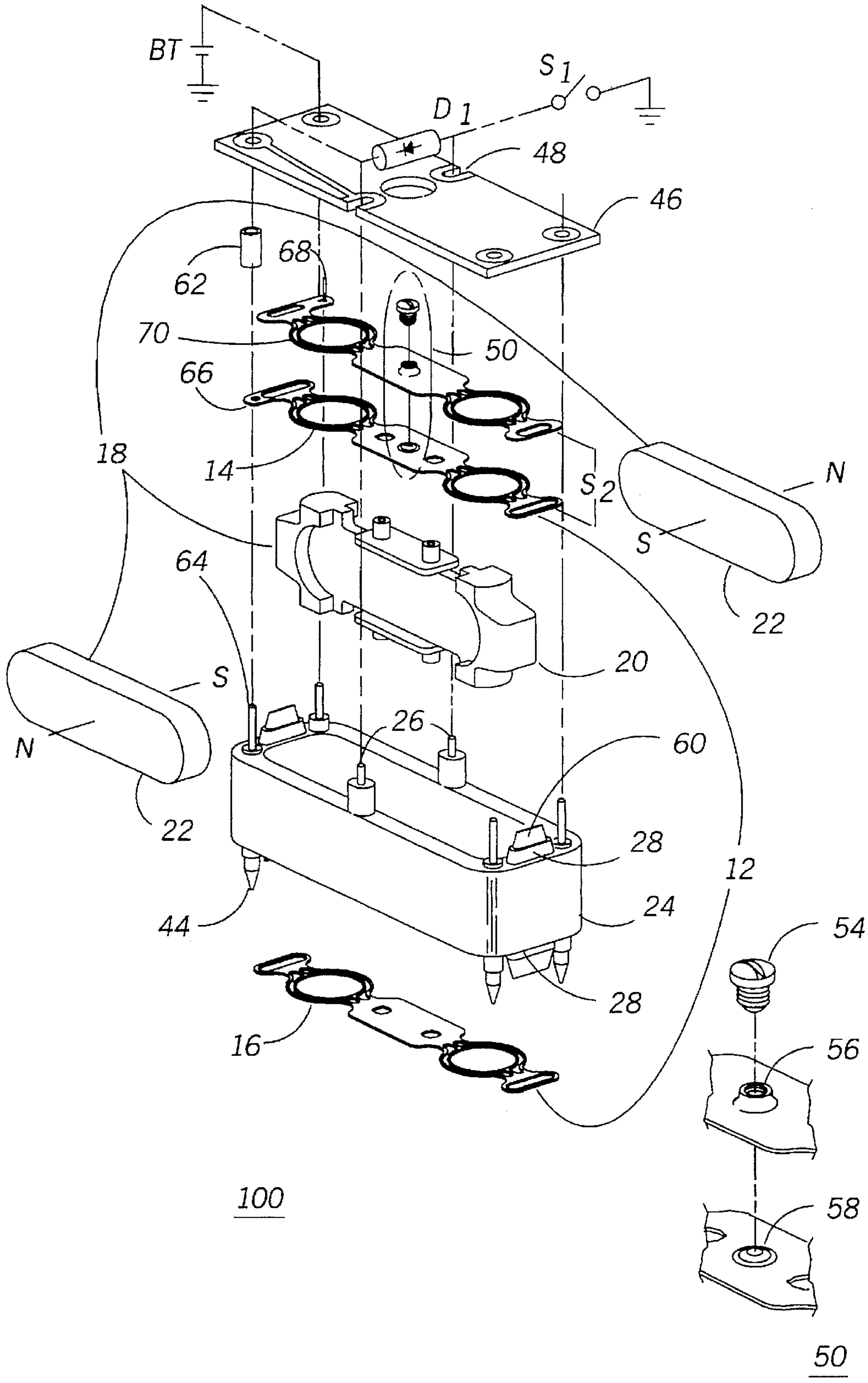
FIG. 1 is an exploded view of a non-linear reciprocating device utilizing a single pole non-linear contactor in accordance with the present invention.

FIG. 1 is an exploded view of a non-linear reciprocating device 100 which utilizes a non-linear contactor in accordance with the preferred embodiment of the present invention. FIG. 1 also shows and identifies external components which are connected to the non-linear reciprocating device 100 in accordance with the present invention which are used to facilitate operation. FIG. 1 clearly demonstrates the simplicity of the external driving circuitry as compared to that required for conventional non-rotational electromagnetic transducers.

The non-linear reciprocating device 100 comprises an armature 12 which includes an upper non-linear suspension member 14 and a lower non-linear suspension member 16, a support frame 24 including a coil 26, a magnetic motional mass 18 including a magnet support 20 and two permanent magnets 22, and a non-linear compliant member 70 operating as a compliant contactor 50. The support frame 24 and the coil 26, in combination, are referred to as an electromagnetic driver 25. Unlike the conventional non-rotational electromagnetic transducers described above, power is supplied to the electromagnetic driver 25 through the compliant contactor 50, which in combination with the upper non-linear suspension member 14, functions as a switch (identified as S2) which couples energy delivered from an external power source, such as a battery, BT, to the coil 26 through the upper non-linear suspension member 14 of the armature 12 and an external switch S1 which operates as an on/off switch as will be described below. The switch S2, formed by the combination of the non-linear compliant member 70 and the upper non-linear suspension member 14, generates a variable pulse width/variable frequency interrupting signal which effects operation of the non-linear reciprocating device 100 without the need of complex external circuitry. A supporting substrate 46, such as a printed circuit board, can be attached to the support frame 24 after the compliant contactor 50 is assembled, as will be described below, and is positioned above the support frame 24 by standoffs 62 which provide clearance between the supporting substrate 46 and the compliant contactor 50 during operation of the non-linear reciprocating device 100. An external diode D1 is mounted to the supporting substrate 46 in a manner well known in the art, such as soldering, and is used to limit the flyback voltage generated across the coil 26 when switch S2 opens, as is well known to one of ordinary skill in the art. The supporting substrate 46, is preferably formed from a suitable printed circuit board material, such as a G10 glass epoxy board, or FR4 glass epoxy board, and is used to provide termination pads 48 for the coil 26 termination. The supporting substrate 46 is attached to the support frame 24 through conductive posts 64 (four of which are shown), also in a manner well known in the art, such as soldering. It will be appreciated that the supporting substrate 46 facilitates the connection of the external circuit components, i. e. the battery BT, switch S1 and diode D1, to the non-linear reciprocating device 100, and can be eliminated when these components are mounted on a supporting substrate to which the non-linear reciprocating device 100 is also mounted. It will also be appreciated, that while not shown in FIG. 1, the non-linear reciprocating device 100 can be enclosed in a housing, thereby making the non-linear reciprocating device 100 a self-contained component which can be directly attached to a battery BT and a switch S1 to provide a tactile alerting device, as will be described in further detail below, when the switch S1 is closed. While switch S1 is depicted as a mechanical switch, it will be appreciated that switch S1 can be provided by an electronic switch as well, such as a transistor switch.

A detailed description of a taut armature resonant impulse transducer which is similar to the non-linear reciprocating device 100 of the present invention can be found in U.S. patent application No. 08/341,242, filed by Holden et al., Nov. 17, 1994 entitled "Taut Armature Resonant Impulse Transducer" which is assigned to the Assignee of the present invention and which is incorporated by reference herein.

The coil 26 is energized through the compliant contactor 50 effecting an interrupted electromagnetic field which generates the reciprocating movement of the magnetic motional mass 18. The electromagnetic driver 25 is preferably manufactured using an injection molding process wherein the coil 26 is molded into the support frame 24, as well as the conductive posts 64 which are isolated and to which the non-linear suspension members are connected, as will be described below. The upper non-linear suspension member 14 and the lower non-linear suspension member 16 attach to the support frame 24 using bosses 28, shown as two upper bosses having a form of a double frustum, and two lower bosses (only one of which is visible,) having a form of a single frustum. The upper and lower non-linear suspension members 14, 16 are secured into place using, for example, a heat or ultrasonic staking process, after which the upper suspension member 14 is connected to one of the conductive posts 64 through a contact 66, using an electrical connection process such as soldering. A non-linear compliant member 70 also attaches to the support frame 24 by the upper frustum section 60 of the two upper bosses, and is secured in place using, for example, a heat or ultrasonic staking process as well, after which the non-linear compliant member 70 is connected to another of the conductive posts 64 through a contact 68, also using an electrical connection process such as soldering. When a housing is provided, a base plate would be positioned over the four lower posts 44 (opposite coil 26 termination) which are then deformed using a staking process, such as a heat or ultrasonic staking to secure the base plate to the support frame 24, after which the housing cover can be attached.

The magnetic motional mass 18 includes a magnet support 20 and two permanent magnets 22. The magnet support 20 is preferably manufactured using a die casting process and is preferably cast from a die casting material such as Zamak 3 zinc die-cast alloy. The magnet support 20 is shaped to provide end restraints and top to bottom restraints which are used to locate the two permanent magnets 22 during assembly to the magnet support 20. The magnet support 20 further includes piers which maximize the mass to volume ratio of the magnet support 20 and which fit within the openings of the upper and lower non-linear suspension members 14, 16 and the compliant contactor 50, as shown in FIG. 1. The thickness of the magnet support 20 is reduced at the end restraints to maximize the excursion of the magnetic motional mass 18 during operation. Four flanges, (two of which are shown in the center of the magnet support 20) are used to secure the upper non-linear suspension member 14 and a lower non-linear suspension member 16 to the magnet support 20 using a staking process, such as orbital riveting.

The compliant contactor 50, in a first embodiment, provides an adjustable contact provided by a set screw 54 which engages a sheet metal nut 56 formed, by way of example, by lancing the non-linear compliant member 70 at the midpoint and tapping the resultant aperture; and a fixed contact 58 formed at the midpoint of the upper non-linear suspension member 14. The set screw 54 is by way of example a 2-56 fillister head machine screw which provides a fine adjustment of the contact gap and pressure.

Operationally, when the non-linear reciprocating device 100 is de-energized, the compliant contactor 50 contact (S2) is closed. Closure of the contact can be adjusted by adjusting the set screw 54 to engage the fixed contact 58. When power is applied to the compliant contactor 50, such as by the closure of switch S1, a direct current (DC) supply voltage is applied to the coil 26 which effects a flow of current through the coil 26 in a direction, such that the electromagnetic field generated causes the magnetic motional mass 18 to displace downward, thereby interrupting the supply of current to the coil 26 through the compliant contactor 50. The displacement of the magnetic motional mass eventually returns toward the center, or rest position, as the non-linear suspension members 14, 16 provide a restoring force which is normal to the reciprocating movement of the magnetic motional mass 18, and electrical contact with the compliant contactor 50 is again made, only this time the compliant contactor 50 is displaced in a direction opposite the restoring force due to movement of the magnetic motional mass 18. The displacement of the magnetic motional mass 18 is repeated by the flow of current through the coil 26. The amplitude of the displacement of the magnetic motional mass 18 increases over a period of time, and coincidentally the frequency of the reciprocating movement of the magnetic motional mass 18 increases as well, as will be explained in further detail below. The reciprocating movement of the magnetic motional mass 18 is transformed through the non-linear suspension members 14, 16 and the electromagnetic driver 25 into tactile energy, which can be used, as an example, to alert a user of the receipt of a message when utilized in a communication device.

Figure 2:
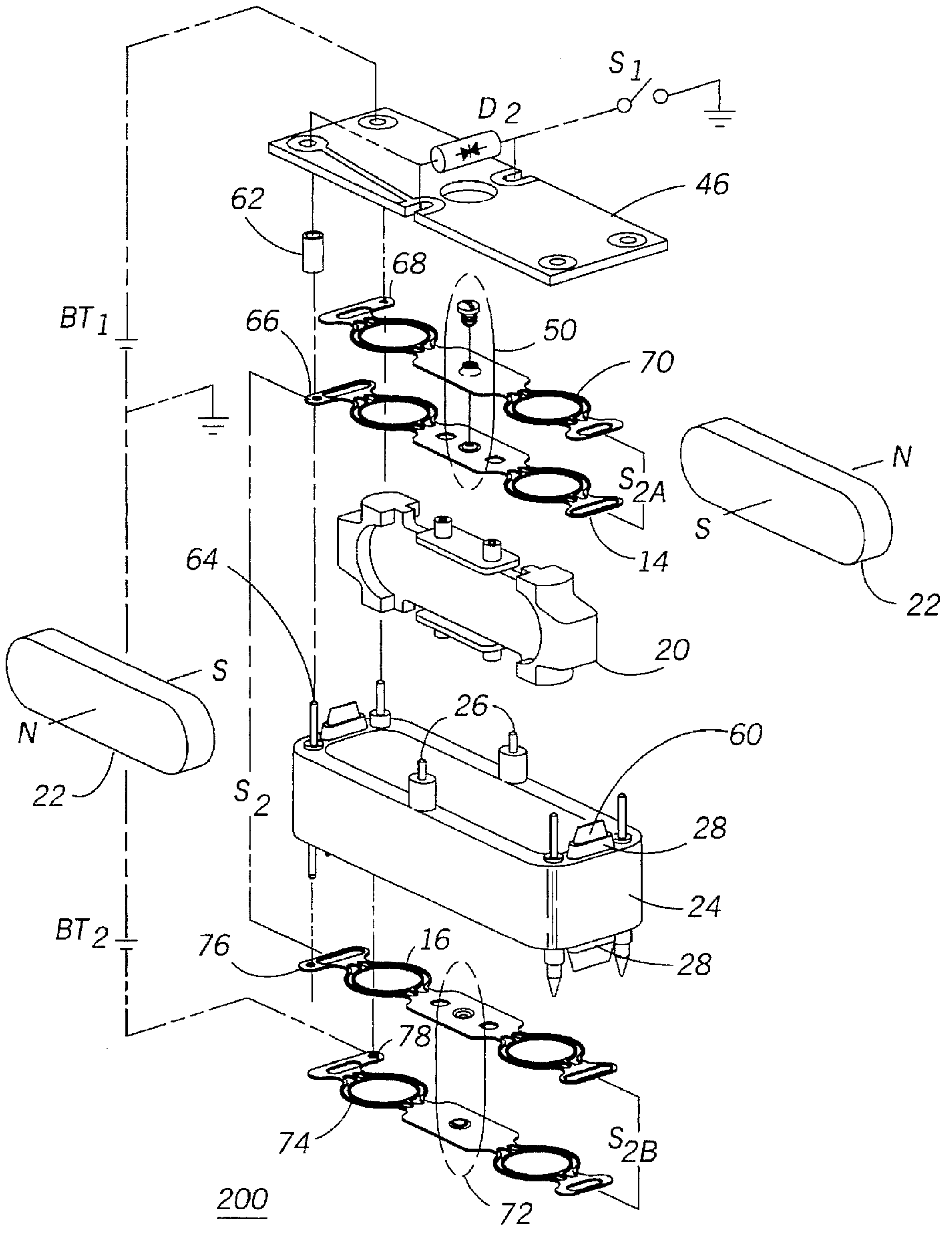
FIG. 2 is an exploded view of a non-linear reciprocating device utilizing double pole non-linear contactors in accordance with the present invention.

FIG. 2 is an exploded view of a non-linear reciprocating device 200 utilizing double pole non-linear contactors in accordance with the present invention. Unlike the non linear reciprocating device 100 of FIG. 1 which utilizes only a single complaint contactor 50, the non-linear reciprocating device 200 utilizes two compliant contactors, a first compliant contactor 50 forming a switch S2A, and a second compliant contactor 72 forming a switch S2B as will be described in further detail below. The upper non-linear suspension member 14 and the lower non-linear suspension member 16 are attached to the support frame 24 by bosses 28 (three of which are shown) having a form of a double frustum. The upper and lower suspension members 14, 16 are secured into place using, for example, a heat or ultrasonic staking process as described above, after which the upper suspension member 14 is connected to one of the conductive posts 64 through a contact 66, and the lower suspension member 16 is also coupled to the conductive post 64 through a contact 76, using an electromechanical connection process such as soldering, as described above. The non-linear compliant member 70 and a non-linear compliant member 74 also attach to the support frame 24 by the upper frustum section 60 of the upper and lower bosses, respectively, and are secured in place using, for example, a heat or ultrasonic staking process as well, as described above, after which the non-linear compliant member 70 is connected to another of the conductive posts 64 through a contact 68, and the non-linear compliant member 74 is connected to a conductive post 64 through a contact 78, also using an electromechanical connection process, such as soldering, as described above.

Unlike the non-linear reciprocating device 100, the non-linear reciprocating device 200 which utilizes double pole compliant contactors is energized by a split power source, such as provided by external batteries BT1 and BT2 which are coupled in series, and which provide a common node at the electrical junction between the batteries to provide a common potential, or ground; a first potential which is positive, and a second potential which is negative relative to the ground.

Operationally, when the non-linear reciprocating device 200 is de-energized, the compliant contactor 50 (S2A) is normally closed and the compliant contactor 72 (S2B) is normally open. When power is applied to the compliant contactor 50, such as by a closure of external switch S1, the supply voltage from battery BT1 is applied to the coil 26 which effects a flow of current through the coil 26 in a direction such that the electromagnetic field generated causes the magnetic motional mass 18 to displace downward, thereby interrupting the supply of current to the coil 26 through the compliant contactor 50. The displacement of the magnetic motional mass 18 eventually closes the compliant contactor 72, and the supply voltage from battery BT2 is then applied to the coil 26 which effects a flow of current through the coil 26 in an opposite direction, such that the electromagnetic field generated causes the magnetic motional mass 18 to displace upward, thereby interrupting the supply of current to the coil 26 through the compliant contactor 72. The amplitude of the displacement of the magnetic motional mass 18 increases over a period of time, and coincidentally the frequency of the reciprocating movement of the magnetic motional mass 18 increases as well, as will be explained in further detail below. Unlike the non-linear reciprocating device 100 wherein the magnetic motional mass 18 is drive in only a single direction, the non-linear reciprocating device 200 is driven in two opposite directions, greatly increasing the amplitude and frequency of operation. Also unlike the non-linear reciprocating device 100, the diode D1 is replaced by a bi-directional diode D2, which is used to limit the flyback voltage generated across the coil 26 when either switch S2A or S2B opens, as is well known to one of ordinary skill in the art.

Figure 3:
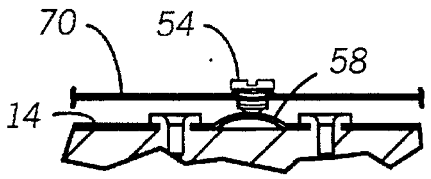
FIG. 3 is a partial cross-sectional view of an adjustable compliant contactor in accordance with a first aspect of the present invention.

FIG. 3 is a partial cross-sectional view of a compliant contactor 50 which is adjustable in accordance with a first aspect of the present invention. FIG. 3 shows the relative position of the upper non-linear suspension member 14 and the non-linear compliant member 70, and the set screw 54 which engages the sheet metal nut 56 to couple to the fixed contact 58 when the non-linear reciprocating device 100 or non-linear reciprocating device 200 is de-energized.

Figure 4:
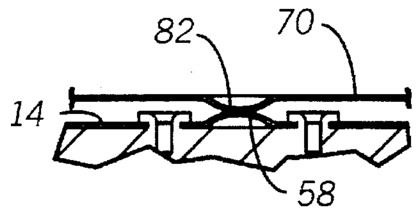
FIG. 4 is a partial cross-sectional view of a non-adjustable compliant contactor in accordance with a second aspect of the present invention.

FIG. 4 is a partial cross-sectional view of a compliant contactor 50 which is non-adjustable in accordance with a second aspect of the present invention. FIG. 4 shows the relative position of the upper non-linear suspension member 14 and the non-linear compliant member 70, and an upper fixed contact 82 which couples to the fixed contact 58 when the non-linear reciprocating device 100 or non-linear reciprocating device 200 is de-energized.

Figure 5:
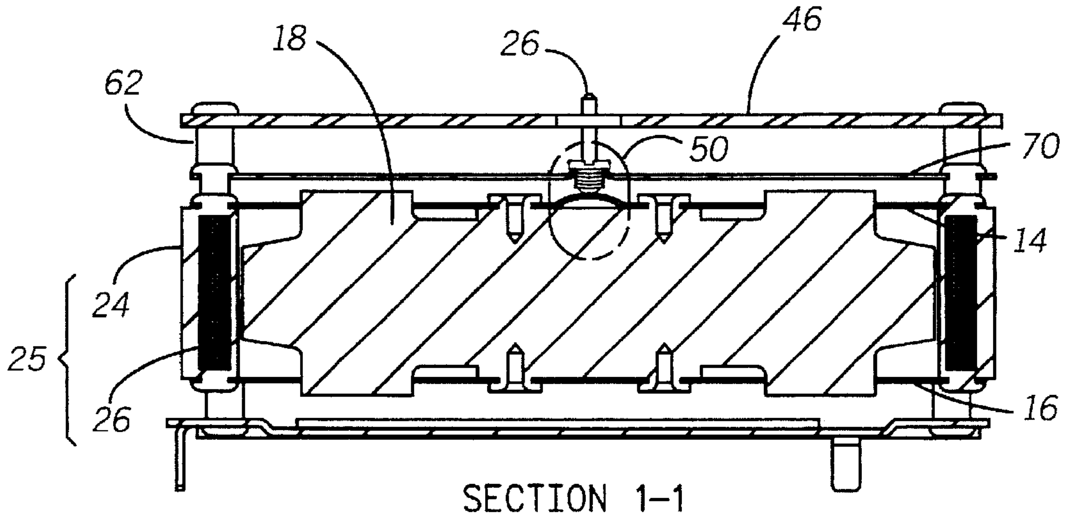
FIG. 5 is a cross-sectional view of the non-linear reciprocating device utilizing a compliant contactor in accordance with the present invention.

FIG. 5 is a cross-sectional view of the non-linear reciprocating device 100 utilizing a compliant contactor 50 in accordance with the present invention. FIG. 5 clearly shows the coil 26 molded into the support frame 24, and further shows the details of the assembly of the upper non-linear suspension member 14, the non-linear compliant member 70 and the lower non-linear suspension member 16 to the support frame 24. It will be appreciated that the spacing of the non-linear suspension member 14 and the non-linear compliant member 70 is largely controlled by the staking process used, as described above. It will be appreciated that the spacing between the non-linear suspension member 14 and the non-linear compliant member 70 can be improved with the use of a spacer (not shown), thereby more readily facilitating the non-adjustable compliant contactor arrangement shown in FIG. 4. It is also clear from FIG. 5 that the placement of the supporting substrate 46 is at a distance sufficient to allow a maximum displacement of the magnetic motional mass 18 during operation of the non-linear reciprocating device 100.

Figure 6:
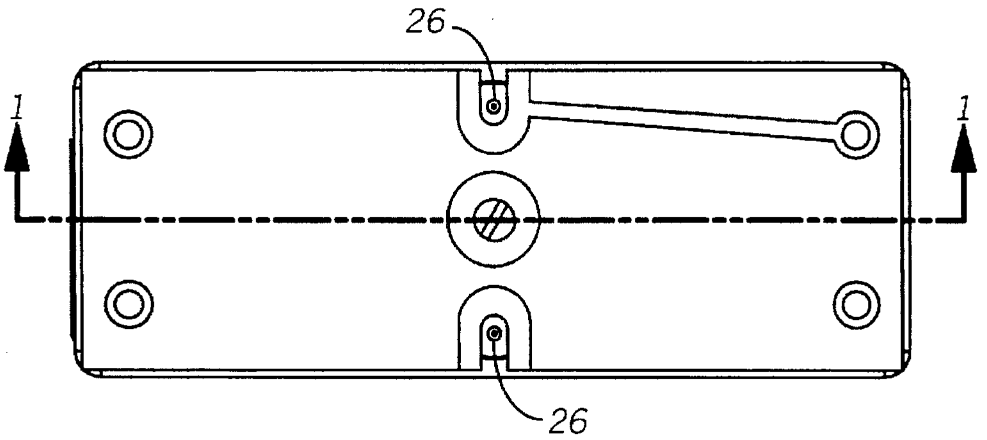
FIG. 6 is an assembled top-view showing the driver circuit board and the coil contacts.

FIG. 6 is an assembled top-view showing the driver circuit board 46 and the contact of the coil 26 referencing the cross-sectional view for FIG. 5.

Figure 7:
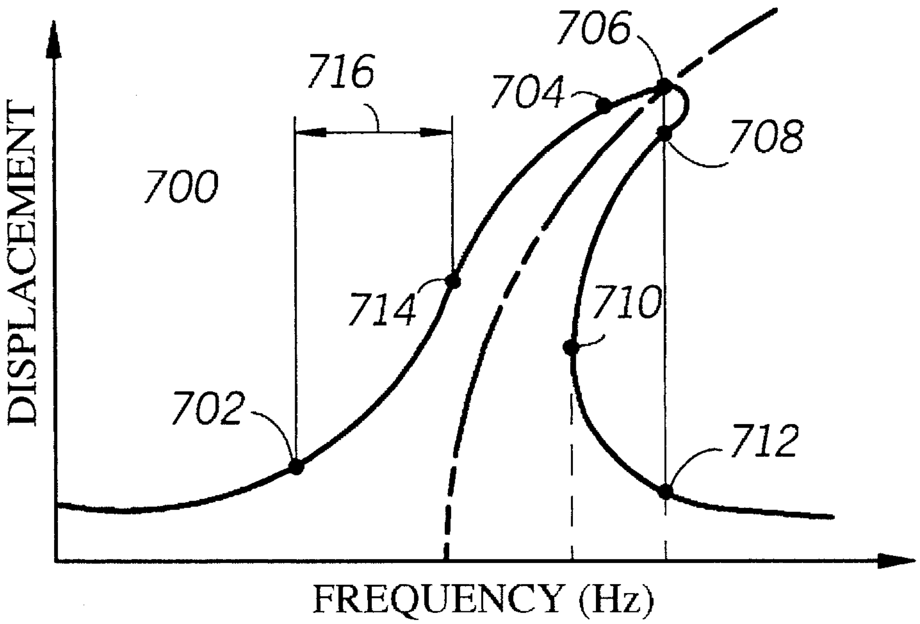
FIG. 7 is a graph depicting the impulse output as a function of the interrupting frequency for the single pole non-linear reciprocating device depicted in FIG. 1.

FIG. 7 is a graph depicting the impulse output for a non-linear, hardening spring type system, such as exhibited by a conventional non-rotational electromagnetic transducer and a non-linear reciprocating device 100 utilizing a compliant contactor in accordance with the present invention. The conventional non-rotational electromagnetic transducer is preferably driven by a swept frequency driving signal, operating between a first frequency to provide a lower impulse output 702 and a second frequency to provide an upper impulse output 704. The upper impulse output 704 corresponds substantially to the maximum driving frequency at which there is only a single stable operating state. As can be seen from FIG. 7, two stable operating states 704 and 710 are possible when the driving frequency is set to that required to obtain impulse output 710, and as the frequency of the drive signal is increased, three operating states, two of which are stable, can exist, such as shown by example as impulse outputs 706, 708 and 712. It will be appreciated, that only those impulse responses which lie on the curve 700 between operating states 702 and 704 are desirable for use of the conventional non-rotational electromagnetic transducer and a non-linear reciprocating device 100 utilizing a compliant contactor in accordance with the present invention as tactile alerting devices, because the impulse output is reliably maximized over that frequency range.

The non-linear reciprocating device 100 of FIG. 1 when initially energized, begins operation near the fundamental mode frequency depicted on curve 700 of FIG. 7 as the lower impulse output 702. Over a short period of time, the displacement of the magnetic motional mass 18 increases rapidly, as the magnetic motional mass 18 increasingly displaces the compliant contactor 50, maintaining electrical contact for longer intervals of time and thereby imparting to the coil 26 increasing energy, which in turn translates into increasing frequency over the frequency range 716 at which the non-linear reciprocating device 100 operates. As will be described below, the maximum displacement of the magnetic motional mass 18 for a non-linear reciprocating device 100 utilizing a single pole compliant contactor is limited as compared to a non-linear reciprocating device 200 utilizing a double pole compliant contactor because the non-linear reciprocating device 100 is energized only during displacement of the magnetic motional mass 18 in a single direction. The maximum impulse output achieved as a result is the impulse output depicted as impulse output 714.

Figure 8:
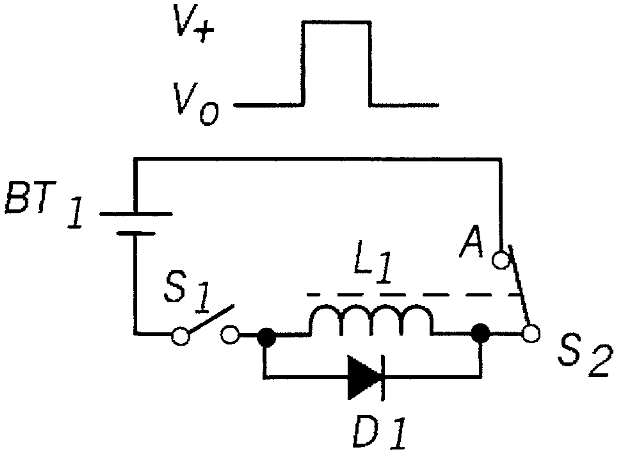
FIG. 8 is an electrical schematic diagram depicting the drive circuit for a non-linear reciprocating device utilizing a compliant contactor in accordance with the present invention.

FIG. 8 is an electrical schematic diagram depicting the drive circuit for a non-linear reciprocating device 100 utilizing a single pole compliant contactor 50 in accordance with the present invention. The non-linear reciprocating device 100 is identified as L1 across which the diode D1 is connected. The compliant contactor is shown as a switch S2 in a normally closed position which is in series with the non-linear reciprocating device L1. A switch S1 is coupled in series with the non-linear reciprocating device L1 and further couples to one terminal of a battery, BT, which as shown is the negative battery terminal. The positive battery terminal couples to the normally closed position A of switch S2 completing the circuit. Operation of the non-linear reciprocating device 100 is as described above in FIG. 1.

Figure 9:
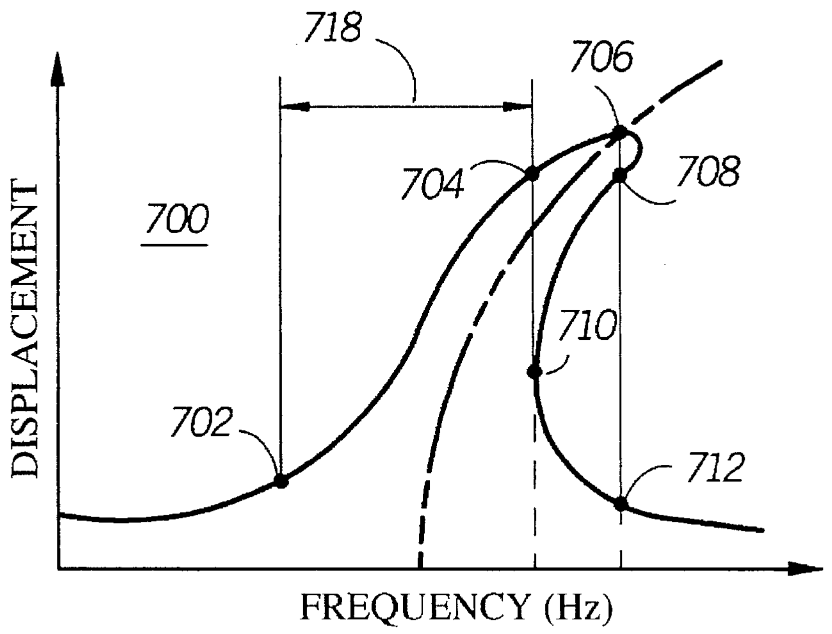
FIG. 9 is a graph depicting the impulse output for a non-linear reciprocating device utilizing a double pole complaint contactor in accordance with the present invention.

FIG. 9 is a graph depicting the impulse output for a non-linear reciprocating device 200 utilizing a double pole complaint contactor 72 in accordance with the present invention. The non-linear reciprocating device 200 utilizing a double pole compliant contactor 72, as with the non-linear reciprocating device 100 utilizing a single pole complaint contactor, when initially energized, begins operation near the fundamental mode frequency depicted on curve 700 as the lower impulse output 702. Over a short period of time, the displacement of the magnetic motional mass 18 increases as the magnetic motional mass 18 increasingly displaces the compliant contactor 50, imparting to the coil 26 an increasing energy, which in turn translates into an increasing frequency at which the non-linear reciprocating device 100 operates. Because the non-linear reciprocating device 200 utilizes a double pole compliant contactor 72, the non-linear reciprocating device 200 is actively energized during both the positive and negative displacement, and the maximum impulse output achieved is significantly greater than the non-linear reciprocating device 100, achieving an impulse output approaching impulse output 704.

The non-linear reciprocating device 200 of FIG. 2 when initially energized, begins operation near the fundamental mode frequency depicted on curve 700 of FIG. 9 as the lower impulse output 702. Over a short period of time, the displacement of the magnetic motional mass 18 increases rapidly, as the magnetic motional mass 18 increasingly displaces the compliant contactor 50 and the compliant contactor 72, maintaining electrical contact for longer intervals of time and thereby imparting to the coil 26 increasing energy, which in turn translates into increasing frequency over the frequency range 718 at which the non-linear reciprocating device 200 operates. As will be described below, the maximum displacement of the magnetic motional mass 18 for a non-linear reciprocating device 200 utilizing a double pole compliant contactor maximizes the tactile energy output delivered because the non-linear reciprocating device 200 is energized during displacement of the magnetic motional mass 18 in both directions. The maximum impulse output achieved as a result is the impulse output depicted as impulse output 704.

Figure 10:
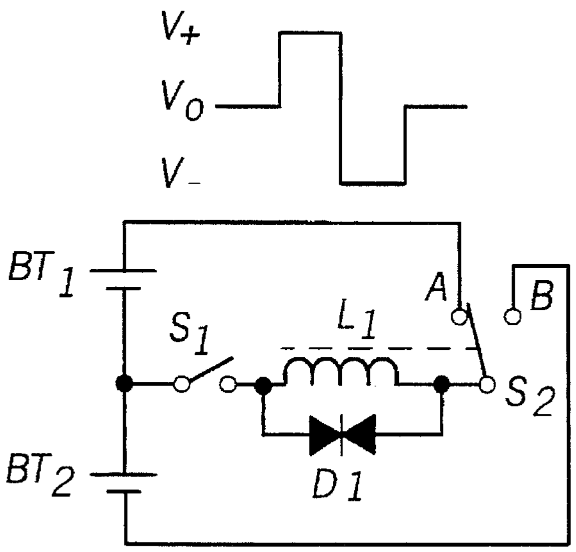
FIG. 10 is an electrical schematic diagram depicting the drive circuit for a non-linear reciprocating device utilizing a double pole compliant contactor in accordance with a first embodiment of the present invention.

FIG. 10 is an electrical schematic diagram depicting the drive circuit for a non-linear reciprocating device 200 utilizing a double pole compliant contactor 72 in accordance with a first embodiment of the present invention. The non-linear reciprocating device 200 is identified as L1 across which the duo-diode D1 is connected. The double pole compliant contactor is shown as a switch S2 having a first normally closed position, A, formed by the upper non-linear suspension member 14 and the non-linear compliant member 72, and a second normally open position B, formed by the lower non-linear suspension member 14 and the non-linear compliant member 74. The common node of switch S2 is coupled in series with the non-linear reciprocating device L1. A switch S1 is coupled in series with the non-linear reciprocating device L1 and further couples to the ground potential of batteries, BT1 and BT2. The positive battery terminal of battery BT1 provides a first potential and couples to position A of the switch S2 completing the circuit while the negative battery terminal of battery BT2 provides a second potential and couples to position B of the switch S2. Operation of the non-linear reciprocating device 200 is as described above in FIG. 2.

Figure 11:
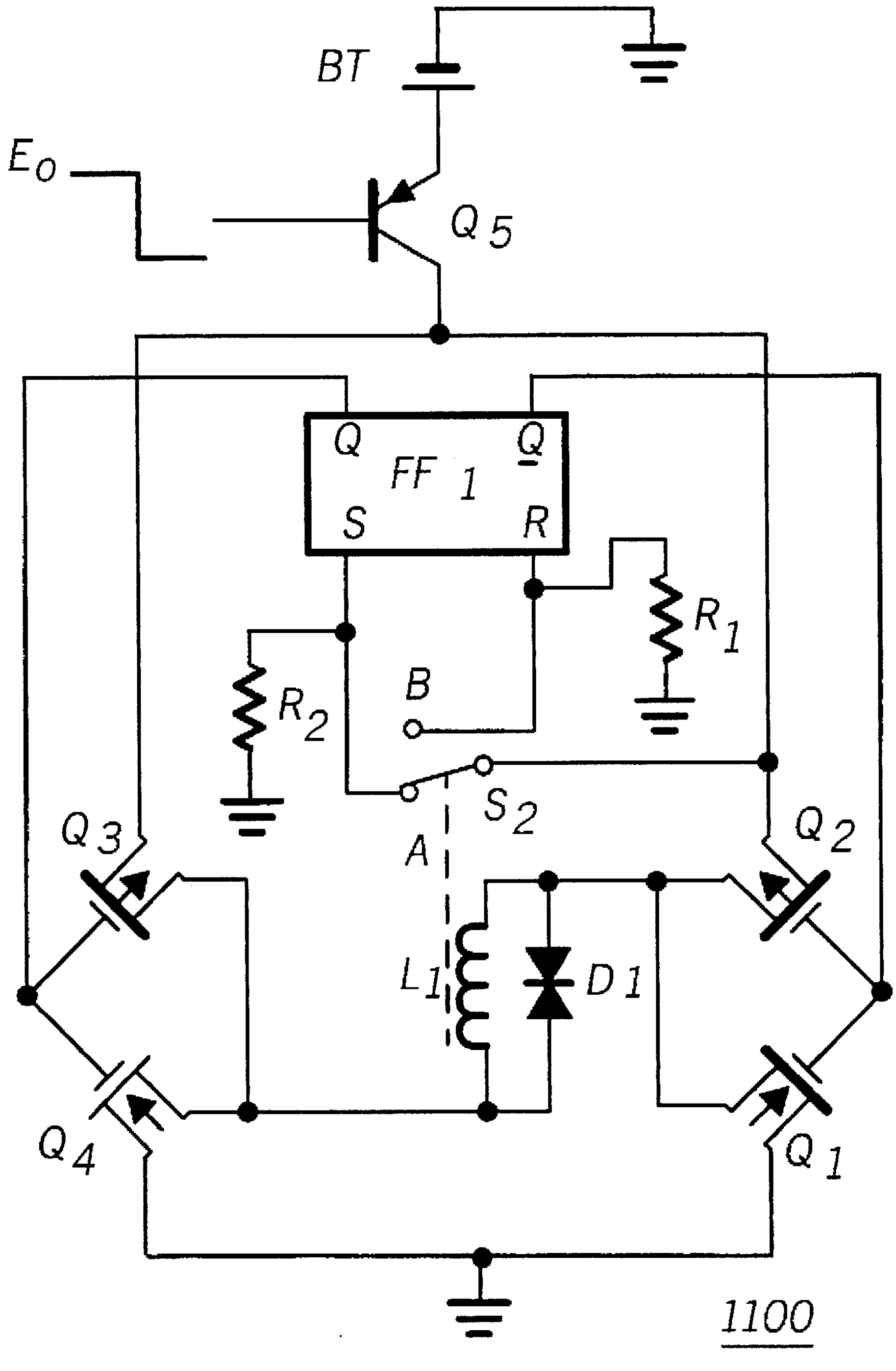
FIG. 11 is an electrical block diagram of a high efficiency driver circuit for a non-linear reciprocating device utilizing a double pole compliant contactor in accordance with a second embodiment of the present invention.

FIG. 11 is an electrical block diagram depicting a high efficiency driver circuit 1100 for a non-linear reciprocating device 200 utilizing a double pole compliant contactor in accordance with a second embodiment of the present invention. The high efficiency driver circuit 1100 includes a bridge driver output circuit including P-channel MOS transistors Q1 and Q4, and N-channel MOS transistors Q2 and Q3. The drains of the P-channel MOS transistors Q1 and Q4 couple to the circuit ground. The drain of the N-channel MOS transistor Q3 couples to the source of the P-channel MOS transistor Q4 and also couples to a first terminal of the coil 26 of the non-linear reciprocating device 200, identified as L1. The drain of the N-channel MOS transistor Q2 couples to the source of the P-channel MOS transistor Q1 and also couples to the second terminal of the coil 26 of the non-linear reciprocating device 200. The duo-diode D1 is connected to the first and second terminals of the non-linear reciprocating device 200. The gate of the P-channel MOS transistor Q4 couples to the gate of the N-channel MOS transistor Q3 and to the Q-output of an R-S flip flop, FF1. The gate of the P-channel MOS transistor Q1 couples to the gate of the N-channel MOS transistor Q2 and to the Q bar-output of the R-S flip flop, FF1. The source of the N-channel MOS transistor Q3 couples to the source of the N-channel MOS transistor Q2 and also couples to the collector of a PNP transistor Q5. The emitter of PNP transistor Q5 couples to the positive terminal of a battery BT1, while the negative terminal of the battery BT1 couples to the circuit ground. The base of the PNP transistor Q5 couples to a signal identified E0 which when high de-energizes the non-linear reciprocating device 200, and when low energizes the non-linear reciprocating device 200. The set input S of the RS flip-flop FF1 couples to the normally closed contact A of compliant contactor S2 and to one terminal of a resistor R2. The opposite terminal of resistor R2 couples to the circuit ground. The reset input R of the RS flip-flop FF1 Couples to the normally open contact B of compliant contactor S2 and to one terminal of a resistor R1. The opposite terminal of resistor R1 couples to the circuit ground.

The high efficiency driver circuit 1100 of FIG. 11 enables a non-linear reciprocating device 200 utilizing a double pole compliant contactor 72 in accordance with the present invention to be operated from a single external battery BT1 while providing the same operating characteristics as being driven from a split power supply as described in FIG. 10 above. A further advantage of the high efficiency driver circuit 1100 is that the coil current is not carried by the double pole compliant contactor 72, but rather is supplied by the bridge driver output circuit including P-channel MOS transistors Q1 and Q4, and N-channel MOS transistors Q2 and Q3. In operation, when the input signal E0 goes low, the PNP transistor is turned on, supplying substantially the supply voltage to the sources of N-channel MOS transistors Q2 and Q3, and further supplying the supply voltage to the set input S of RS flip-flop FF1 and resistor R2 through the normally closed contact A of compliant contactor 72, which in turn turns N-channel MOS transistor Q3 on and P-channel MOS transistor Q1 on driving current through the coil 26 in a first direction, eventually opening normally closed contact A and closing normally open contact B. When normally open contact B is closed, the supply voltage is supplied to the reset input R of RS flip-flop FF1 and resistor R1, which in turn turns N-channel MOS transistor Q2 on and P-channel MOS transistor Q4 on, driving current through the coil 26 in a second opposite direction, eventually opening normally open contact B and closing normally closed contact A. The cycle is repeated with an ever increasing displacement of the magnetic motional mass 18 and an ever increasing frequency of operation as described in FIG. 9.

Figure 12:
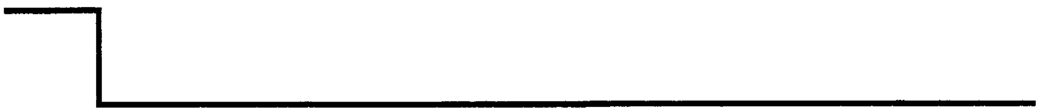
FIGS. 12–14 are wave forms depicting operation of the non-linear reciprocating device utilizing a compliant contactor in accordance with the present invention.
Figure 13:
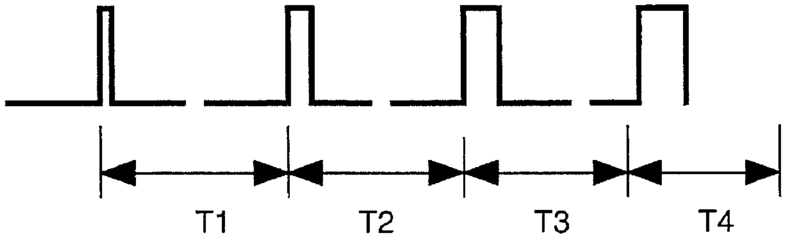
Figure 14:
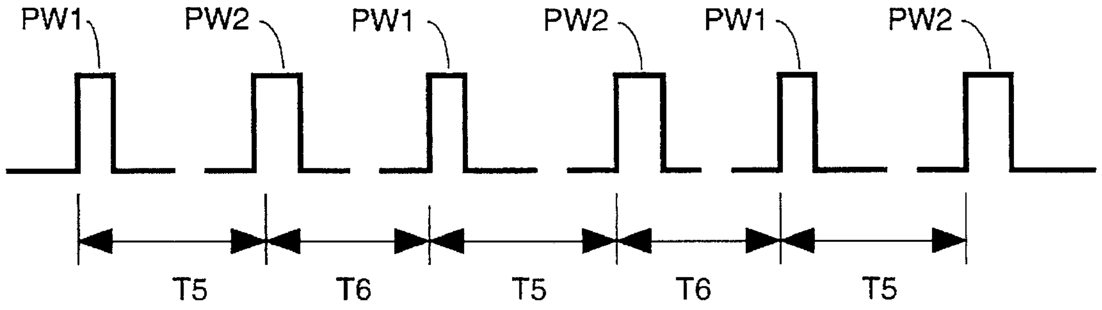

FIGS. 12–14 are wave forms which depict the operation of the non-linear reciprocating device 100 utilizing a compliant contactor 50 in accordance with the present invention. The wave forms depicted are not to scale, and are provided for discussion purposes only. FIG. 12 depicts an enable signal 1200 which turns the non-linear reciprocating device 100 on and off. When the enable signal 1200 amplitude is high such as when switch S1 is open, the non-linear reciprocating device 100 is off, and when the enable signal 1200 amplitude is low such as when switch S1 is closed, the non-linear reciprocating device 100 is on.

FIG. 13 depicts the interrupting signals 1300 initially generated by the non-linear compliant contactor when the non-linear reciprocating device is switched from off to on. The current is initially supplied to the coil 26 for only a very short interval of time and the interval of time during which current is supplied to the coil 26 increases in response to the increasing displacement of the magnetic motional mass 18. Also as depicted in FIG. 13, as the interval of time during which current is supplied to the coil 26 increases, the frequency of displacement of the magnetic motional mass 18 also increases correspondingly, shown as decreasing time intervals T1, T2, T3, and T4.

FIG. 14 depicts the interrupting signals 1300 generated by the non-linear compliant contactor when the displacement of the magnetic motional mass 18 has achieved the maximum displacement and is operating at a frequency corresponding to impulse output 714 for the non-linear reciprocating device 100 or a frequency corresponding to impulse output 704 for the non-linear reciprocating device 200. As shown, the pulse width PW1 and PW2 which depict the time interval that current is supplied to the coil 26 in not constant, and consequently the frequency of operation is not constant, as would occur in a linear transducer, but rather the operating frequency varies about the maximum operating frequency corresponding to impulse output 714 for the non-linear reciprocating device 100 or the maximum operating frequency corresponding to impulse output 704 for the non-linear reciprocating device 200.

The operation described above is facilitated because the upper non-linear suspension member 14 and the non-linear compliant member 70 which in combination form the compliant contactor 50 are displaced substantially equally by the displacement of the magnetic motional mass 18. The displacement of the magnetic motional mass 18 results in an increasing dwell time during which the compliant contactor contact S2 is closed, which in turn results in an increasing displacement and frequency. No such operation is observed in a linear vibrator as the contactor contacts are rigid and are not displaced by the operating contact. Thus, in a linear vibrator, the frequency of vibration is fixed at a single frequency, unlike that of the non-linear reciprocating device 100 in accordance with the present invention.

In summary, the non-linear reciprocating device 100 with a compliant contactor 50, or the non-linear reciprocating device 200 with a double pole compliant contactor 72 initially begins operation at a relatively low frequency and rapidly increases frequency as the displacement of the magnetic motional mass 18 increases. The amplitude of the displacement of the magnetic motional mass 18 and the frequency at which the displacement occurs to a level described in FIGS. 7 and 9, and unlike a linear transducer which operates at a single displacement and single operating frequency, the non-linear reciprocating device 100 with a compliant contactor 50, or the non-linear reciprocating device 200 with a double pole compliant contactor 72 varies in frequency as shown in FIG. 14 even after the maximum displacement of the magnetic motional mass 18 has occurred.

In summary, there has been described a non-linear reciprocating device which utilizes a compliant contactor which does not require a complex external driving circuit. Also as has been described above, the operation of the non-linear reciprocating device is self exciting when powered and is not dependent on external circuit elements, but rather is dependent on the natural response frequency of the non-linear reciprocating device. Also as has been described above, the natural mechanical system response of the non-linear reciprocating device is used to maximize the tactile output over the non-linear operating range of the non-linear reciprocating device. And finally what has been described above is that the non-linear reciprocating device is self exciting when powered which results in the frequency of operation of the non-linear reciprocating device being swept dynamically, resulting in the tactile energy output of the non-linear reciprocating device to be maximized.

We claim:

1. A non-linear reciprocating device, comprising:

an armature including non-linear suspension members;

a compliant contactor coupled to a power source and further coupled to said armature for generating an interrupting signal;

an electromagnetic driver, coupled to said non-linear suspension members, for effecting an electromagnetic field in response to the interrupting signal; and a magnetic motional mass suspended by said non-linear suspension members, and coupled to said electromagnetic field for generating a reciprocating movement of said magnetic motional mass in response thereto, the reciprocating movement of said magnetic motional mass being transformed through said non-linear suspension members and said electromagnetic driver into tactile energy.

2. The non-linear reciprocating device according to claim 1, wherein said non-linear suspension members provide a restoring force which is normal to the reciprocating movement of said magnetic motional mass.

3. The non-linear reciprocating device according to claim 2, wherein said non-linear suspension members comprise upper and lower non-linear suspension members for stabilizing the reciprocating movement of said magnetic motional mass.

4. The non-linear reciprocating device according to claim 1, wherein said electromagnetic driver comprises a coil having a first terminal and a second terminal, and wherein said compliant contactor couples to said first terminal, and wherein said second terminal couples to a common potential.

5. The non-linear reciprocating device according to claim 4, wherein said coil generates a flyback voltage in response to the interrupting signal, and wherein said non-linear reciprocating device further comprises a diode, coupled between said first terminal and said second terminal, for limiting the flyback voltage generated by said coil.

6. The non-linear reciprocating device according to claim 4, wherein said compliant contactor is connected to said armature when power is not supplied to said coil.

7. The non-linear reciprocating device according to claim 1, wherein the reciprocating movement is non-linear, and wherein the non-linear reciprocating movement of said magnetic motional mass is effected by a displacement of said compliant contactor relative to said magnetic motional mass.

8. The non-linear reciprocating device according to claim 7, wherein the non-linear reciprocating movement of said magnetic motional mass varies in amplitude randomly over time.

9. The non-linear reciprocating device according to claim 2, wherein the electromagnetic field effects movement of the magnetic motional mass in a first direction and the restoring force effects movement of the magnetic motional mass in a second, opposite, direction.

10. The non-linear reciprocating device according to claim 1, wherein connection of said first compliant contactor with said first non-linear suspension member is adjustable.

11. The non-linear reciprocating device according to claim 1 further comprising a housing for enclosing said device.

12. A non-linear reciprocating device, comprising:

an armature including first and second non-linear suspension members;

first and second compliant contactors, coupled to a power source, and further coupled to said armature for generating interrupting signals;

an electromagnetic driver, coupled to said first and second non-linear suspension members and to said first and second compliant contactors, for effecting an alternating electromagnetic field in response to the interrupting signals; and a magnetic motional mass suspended by said first and second non-linear suspension members, and coupled to said alternating electromagnetic field for generating a reciprocating movement of said magnetic motional mass in response thereto, the reciprocating movement of said magnetic motional mass being transformed through said first and second non-linear suspension members and said electromagnetic driver into tactile energy.

13. The non-linear reciprocating device according to claim 12, wherein said first and second non-linear suspension members provide a restoring force which is normal to the reciprocating movement of said magnetic motional mass.

14. The non-linear reciprocating device according to claim 13, wherein said first and second non-linear suspension members comprise upper and lower non-linear suspension members suspending said magnetic motional mass for stabilizing the reciprocating movement of said magnetic motional mass.

15. The non-linear reciprocating device according to claim 12, wherein said power source provides a common potential, a first potential and a second potential, and wherein said electromagnetic driver comprises a coil having a first terminal and a second terminal, wherein said first compliant contactor couples to said first potential and to said first terminal, said second compliant contactor couples to said second potential and also to said first terminal, and wherein a second terminal couples to said common potential.

16. The non-linear reciprocating device according to claim 15, wherein said coil generates a flyback voltage in response to the interrupting signal, and wherein said non-linear reciprocating device further comprises a bilateral diode, coupled between said first terminal and said second terminal, for limiting the flyback voltage generated by said coil.

17. The non-linear reciprocating device according to claim 15, wherein said first compliant contactor is connected to said first non-linear suspension member when power is not supplied to said coil.

18. The non-linear reciprocating device according to claim 17, wherein the reciprocating movement of said magnetic motional mass is non-linear, and wherein the non-linear reciprocating movement is effected by displacement of said first compliant contactor by said magnetic motional mass in a first direction, and further by displacement of said second compliant contactor by said magnetic motional mass in a second opposite direction.

19. The non-linear reciprocating device according to claim 18, wherein said first compliant contactor generates a first interrupting signal by connecting power to said coil at a first polarity, and wherein said second compliant contactor further generates a second interrupting signal by connecting power to said coil at a second opposite polarity.

20. The non-linear reciprocating device according to claim 12, wherein the non-linear reciprocating movement of said magnetic motional mass varies in amplitude randomly over time.

21. The non-linear reciprocating device according to claim 12, wherein connection of said first compliant contactor with said first non-linear suspension member is adjustable.

22. The non-linear reciprocating device according to claim 12, wherein said electromagnetic driver comprises:

a coil having a first terminal and a second terminal; and a switched electronic driver, coupled to said power source and to said first terminal and to said second terminal of said coil, and further coupled to said first and second compliant contactors, for effecting an alternating electromagnetic field for generating the reciprocating movement of said magnetic motional mass.

23. The non-linear reciprocating device according to claim 22, wherein said power source provides a common potential and a first potential, and wherein said switched electronic driver couples to said first potential for powering said coil.

24. The non-linear reciprocating device according to claim 12 further comprising a housing for enclosing said device.

* * * * *